Figures 1, 2:
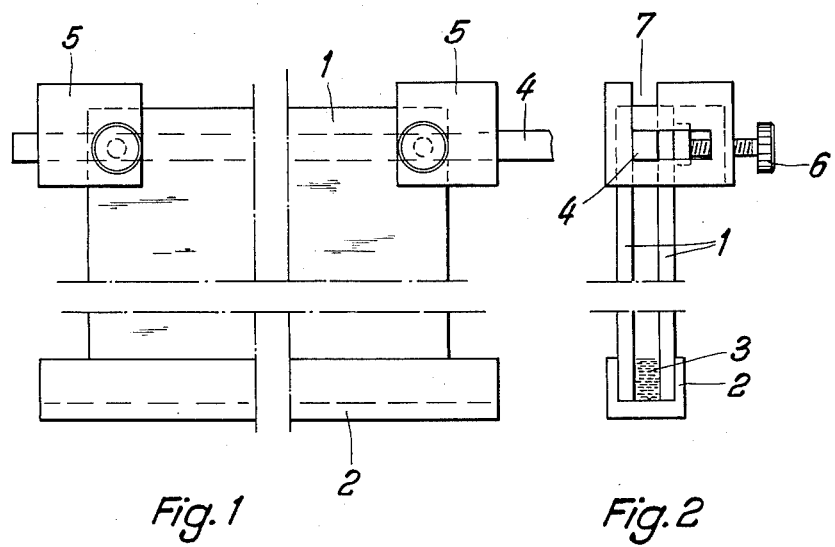

July 9, 1963 H. WOELK 3,097,061
PROCESS FOR THE PREPARATION OF MULTI-PANE INSULATING GLASS
Filed July 5, 1960 2 Sheets-Sheet 1

Hubert Woelk
Inventor:
by Mason, Porter, Miller & Stewart
Attorneys

July 9, 1963        H. WOELK        3,097,061
PROCESS FOR THE PREPARATION OF MULTI-PANE INSULATING GLASS
Filed July 5, 1960        2 Sheets-Sheet 2

Hubert Woelk
Inventor:
by Mason, Porter, Miller & Stewart
Attorneys 3,097,061
PROCESS FOR THE PREPARATION OF
MULTI-PANE INSULATING GLASS
Hubert Woelk, Porz-Zundorf, Germany, assignor to Spiegelglaswerke Germania Aktiengesellschaft Zweigniederlassung der Glaceries de Saint Roch Societe Anonyme, Porz-Urbach, Germany
Filed July 5, 1960, Ser. No. 40,781
Claims priority, application Germany July 3, 1959
7 Claims. (Cl. 18—59)

The invention relates to the production of multi-pane insulating glass wherein the inter-panes gap is secured by an edge strip which seals the insulating space bounded by such strip and by the panes and which consists of a self-adhesive potting resin or of a self-adhesive potting resin mixture.

According to known practice the edge strip parts are so formed that the panes, spaced apart at the required distance from one another, have their edges dipped in sequence into a trough filled with a liquid potting resin or potting resin mixture and are left in the trough until such resin or mixture has set. Preferably, after the edge strip has been produced between the first edges of the panes to be joined together, opposite edges of the last-mentioned panes are dipped into the trough filled with a liquid potting resin or with a liquid potting resin mixture, and after this part of the edge strip has set, the edge strip parts of the two remaining edges are formed in the same way.

The method provides another and simpler method of forming the edge strips, wherein, and more particularly in association with known methods, a number of parts of a single edge strip can be formed simultaneously.

In the method according to the invention, a boundary strip which forms the outer boundary for the insulating space and which has previously been treated with a separating agent is placed, at a distance from the pane edges corresponding to the required edge strip height, between the panes which it is required to interconnect by the edge strip, and the trough formed by such boundary strip and by the outer edge zones of the panes is filled with liquid potting resin or with liquid potting resin mixture.

Advantageously, the trough formed between the top edges of the panes to be joined together is filled with edge strip material during the time that that edge strip part is setting which has been formed by known methods—i.e. the edge strip part formed between the bottom pane edges by the introduction thereof into a trough filled with the same substance—and the ends of the trough formed between the top edges of the panes by the introduction of a boundary strip are sealed, for instance, by the provision of riders.

According to another feature of the invention, troughs are formed between the panes on opposite sides thereof and are simultaneously filled with the edge strip material; preferably, the side troughs are formed, after the edge strip material of the first edge strip part formed in accordance with known methods has set, by introducing the boundary strips from the top, whereupon the side troughs are closed laterally by clips which extend over the whole edge length of the panes, whereupon the substance which will subsequently form the side edge strip parts is introduced from the top into the troughs.

The edge strip material can be introduced into the troughs in any way, for instance, by pouring, spraying, introduction with a spatula or the like. The edge strip material can be preheated before being placed between the panes. If such preheating is not provided, the edge strip material must be heated after it has been introduced between the panes, to ensure its uniform distribution and polymerization; heating can be performed by using heatable sealing strips. The method can be carried into effect without any heat being supplied subsequently to the edge strip material which is introduced into the trough in the liquid state; the only result of not providing any heating is that the time required for polymerization is increased, possibly by a considerable amount.

Figure 3:
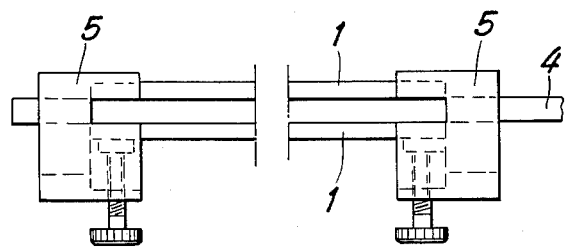
Figure 4:
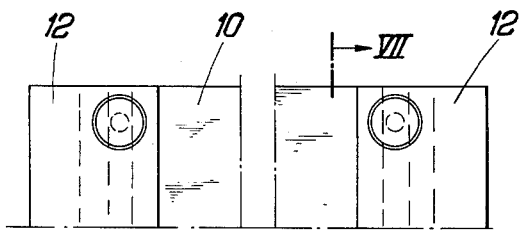
Figure 5:
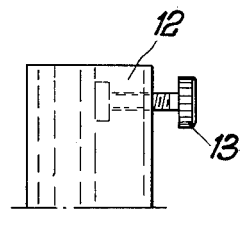
Figure 6:
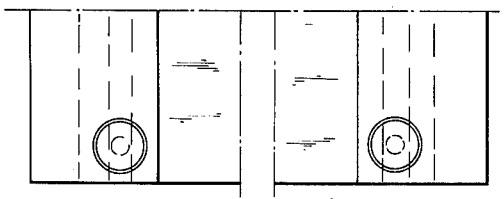
Figure 6:
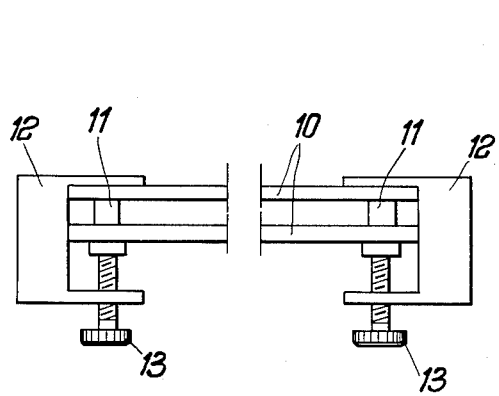
Figure 7:
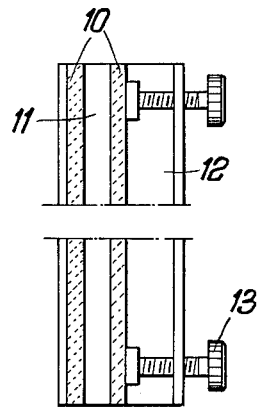

Two embodiments of the method according to the invention are illustrated in the drawings wherein:

FIGS. 1, 2 and 3 illustrate a method wherein, as the bottom edge strip part is formed, the opposite—i.e. a top—edge strip part is formed simultaneously, FIG. 1 being a front elevation of the panes while the top edge strip part is being formed, FIG. 2 being a corresponding side elevation, and FIG. 3 being a corresponding plan view whilst FIGS. 4–7 illustrate a method wherein, as the top edge strip part is formed, the two contiguous side edge strip parts are formed simultaneously, FIG. 4 being a front elevation of the panes, while the side edge strip parts are being formed, FIG. 5 being a corresponding side elevation, FIG. 6 being a corresponding plan view and FIG. 7 being a sectional view taken along the line VII—VII of FIG. 4.

Referring to FIGS. 1–3, two glass panes 1, 1 extend parallel with one another (although they could be placed at an angle to one another) and are introduced into a trough 2 which has been filled with a liquid potting resin or with a liquid potting resin mixture. The edge strip material 3, sets in the trough and, after setting, forms the bottom edge strip part interconnecting the two panes 1, 1.

A sealing strip 4 which, as can be seen in the drawings, projects laterally above the panes 1, 1, is introduced between the top parts thereof at a distance from the pane edges which is equal to the required edge strip height. Two clips 5 formed with lateral apertures through which the strip 4 can extend are slid onto the panes 1, 1 from the side and the same are pressed against the strip 4 by screws 6 being tightened. The clips 5, which project a little beyond the panes 1, 1 form a lateral boundary of a trough formed by the strip 4 and the panes 1, 1; the clip side walls are formed above the trough with recesses 7, the bottom edge of which is at the level of the top edge of the panes 1, 1. The trough thus formed is filled with liquid resin or with a liquid resin mixture while the edge strip part 3 is setting, and after such filling has set, the two panes are provided with edge strip parts on two opposite sides. The edge strip parts are then fitted to those two edges on the panes 1, 1 which are still free as follows:

Referring to FIGS. 4–7, two glass panes 10, 10 to be joined together by an edge strip and two side edge strip parts—i.e., the edge strip parts which are on the left-hand and right-hand side of FIGS. 4 and 6—are formed simultaneously. To this end, two boundary strips 11 are placed between the panes 10, 10 at both sides and at a distance from the pane edges which is equal to the required edge strip height, and the panes 10, 10 are pressed against the strips 11 by clips 12 when screws 13 are tightened. The clips 12 extend over the whole edge length of the panes 10, 10 and form a lateral closure of the troughs formed by the strip 11 and by the pane edges. The potting resin which subesquently forms the side edge strip parts is poured into such troughs from the top and left therein until it has set.

After the clips 5 shown in FIGS. 1 to 3 or clips 12 shown in FIGS. 4 to 7 have been removed, the strips 4, 11 respectively which have previously been treated with a separating agent, can be removed from the gap between the glass panes.

If simultaneous preparation is required of the edge strip parts on the bottom edge of the panes and the two contiguous lateral edge strip parts, the panes 10, 10 have their bottom edges placed in a trough filled with the liquid resin mixture, exactly as shown in FIGS. 1 to 3. After the mixture in the trough has set, the strips 11 are introduced from the top between the panes 10, 10 and pressed firmly thereagainst by the laterally applied clips 12, whereupon the potting resin mixture is pressed into the lateral troughs by means of a press and left in such troughs until the lateral edge strip parts have completely set.

The potting resin in the troughs can be heated by means of electrically heatable sealing strips or, in the case shown in FIGS. 4–7, for instance, by electrically heatable clips 12.

What I claim is:

1. The method of forming a multiple-pane insulating glass panel which comprises standing two panes of glass vertically with their edges parallel and at a selected distance apart, interposing a boundary strip treated with a separating agent temporarily between the panes within the said edges, closing the space between the edges of the panes beyond the boundary strip, flowing sealing compound in the trough thus formed setting the compound and removing the boundary strip.

2. The method of forming a multiple-pane insulating glass panel which comprises standing two parallel panes of glass vertically in a trough of sealing compound at a selected distance apart, interposing a boundary strip treated with a separating agent and having a width equal to the same distance temporarily horizontally between the panes below their tops defining a second trough of the desired width of seal, closing the space between the side edges of the panes above the boundary strip, flowing sealing compound in said second trough, setting said sealing compound and removing the boundary strip and first named trough.

3. The method as defined in claim 2 in which the setting of the sealing compound in both troughs is simultaneous.

4. The method of forming a multiple-pane insulating glass panel which comprises standing two panes of glass vertically with their top edges parallel at a selected distance apart, interposing a boundary strip treated with a separating agent temporarily between the panes below the said top edges, blocking each side edge of the panes above the boundary strip with a clamp, flowing sealing compound in the trough thus formed, setting the compound and removing the boundary strip.

5. The method of forming a multiple-pane insulating glass panel which comprises standing two panes of glass vertically with their side edges parallel and at a selected distance apart, interposing a vertical boundary strip which has previously been treated with a separating agent temporarily between the panes spaced inwardly from each side edge, closing the space between the side edges of the panes, flowing sealing compound in the interposed area, setting the compound and removing the boundary strips.

6. The method of forming a multiple-pane insulating glass panel which comprises standing two parallel panes of glass vertically in a trough of setting sealing compound at a selected distance apart, interposing a boundary strip which has previously been treated with a separating agent and of width equal to the same distance vertically between the panes inwardly from each side edge thereof temporarily, blocking each side edge of the panes with a clamp, flowing sealing compound in the vertical area thus formed, setting said compound and removing the boundary strips.

7. The method as defined in claim 1, in which heat is applied through the boundary strip to effect setting of the sealing compound.

References Cited in the file of this patent

UNITED STATES PATENTS

| | | |
|---|---|---|
| 2,011,557 | Anderegg | Aug. 20, 1935 |
| 2,091,615 | Rohn et al. | Aug. 31, 1937 |
| 2,275,812 | Woelfel | Mar. 10, 1942 |
| 2,336,544 | Hopfield | Dec. 14, 1943 |